United States Patent [19]

Hardigg et al.

[11] Patent Number: 5,296,075
[45] Date of Patent: Mar. 22, 1994

[54] WELDING APPARATUS

[75] Inventors: James S. Hardigg, Conway; Edward W. Turner, Deerfield, both of Mass.

[73] Assignee: Hardigg Industries, Inc., South Deerfield, Mass.

[21] Appl. No.: 12,873

[22] Filed: Feb. 3, 1993

[51] Int. Cl.⁵ .............................. B32B 31/00
[52] U.S. Cl. ........................ 156/362; 156/69; 156/499; 156/556; 156/583.1
[58] Field of Search ............... 156/69, 556, 583.1, 156/583.8, 583.9, 499, 498, 362; 53/373.4, 373.5, 485, 486; 29/731, 623.2

[56] References Cited

U.S. PATENT DOCUMENTS

| | | | |
|---|---|---|---|
| 3,883,369 | 5/1975 | Badger et al. | 156/499 |
| 4,352,977 | 10/1982 | Hardigg et al. | 219/243 |
| 4,390,384 | 6/1983 | Turner | 156/498 |
| 4,601,768 | 7/1986 | Bouyoucos | 156/499 |
| 4,927,642 | 5/1990 | Kunz | 156/499 |
| 5,151,149 | 9/1992 | Swartz | 156/499 |
| 5,197,994 | 3/1993 | Brocksmith | 156/499 |

Primary Examiner—David A. Simmons
Assistant Examiner—Chester T. Barry
Attorney, Agent, or Firm—Fishman, Dionne & Cantor

[57] ABSTRACT

An improved device and method for welding battery jar covers onto battery jars with the battery elements and terminal posts in position in the jar wherein said improvement includes means for pressing the molten bead, created between the battery jar and the battery cover during welding, flat against the cover and the jar until said molten bead solidifies.

5 Claims, 4 Drawing Sheets

WELDING APPARATUS

BACKGROUND OF THE INVENTION

The present invention relates to an improved device and method for welding plastic battery jar covers onto plastic battery jars. Specifically, this invention relates to means for pressing the molten bead, created between the battery jar and the battery cover during welding, flat against the cover and the jar interface until said molten bead solidifies.

In U.S. Pat. No. 4,352,977 entitled "Welding Apparatus and Method," an apparatus and method for welding battery covers onto battery jars are disclosed. Said Patent, the disclosures of which are incorporated herein by reference, discloses and claims an apparatus which comprises a main frame, a work zone having loading, welding and unloading stations, means for moving containers to be welded successively from said loading station to said welding station and from said welding station to said unloading station, welding means for positioning and controlling the relationship between the cover and the jar during welding and for forming a welded joint wherein said welding means includes a heating assembly and a clamping assembly, drive means for operating the apparatus and contact means for activating the drive means in a predetermined sequence.

While the apparatus and method disclosed in U.S. Pat. No. 4,352,977 performs satisfactorily, it has been found that when a thermoplastic hot-plate weld is accomplished using said apparatus and method, the melting process causes molten material to form a bead on each side of the interface between the cover and the jar. Under present practices, the outer bead must be cut off or trimmed after the weld has been made and the plastic solidified so that the battery cell will fit into a steel container or tray with other battery cells. It is believed that the cutting or trimming process can open up small weld line imperfections which can result in microscopic leak paths which permit electrolytes (sulfuric acid) to escape the cell causing corrosion problems as well as contributing to the short-circuiting of the battery.

SUMMARY OF THE INVENTION

In view of the above, the apparatus and method of U.S. Pat. No. 4,352,977 has been modified so as to present means whereby the molten bead formed at the interface between the cover and the jar is pressed flat thus eliminating a cutting or trimming step and its resulting problems. In this regard, it has been found that the dimensions of a finished welded assembly formed using the apparatus and method of the present invention are only 0.015 to 0.025 inches greater than original unwelded dimensions.

Accordingly, it is a primary objective of the present invention to provide a device which will allow the welding of battery covers and battery jars in a manner which minimizes the formation of a bead of molten material on the outside of the battery at the interface of the jar and the cover.

It is another object of the present invention to provide means for pressing against the interface between a battery jar and battery cover during the welding together of said battery jar and battery cover, i.e. during the welding process.

DESCRIPTION OF THE DRAWINGS

A more complete and detailed understanding of the present invention and its objectives may be obtained by reference to the following detailed description in combination with the drawings wherein.

DETAILED DESCRIPTION OF THE PREFERRED EMBODIMENT

Figure 1:
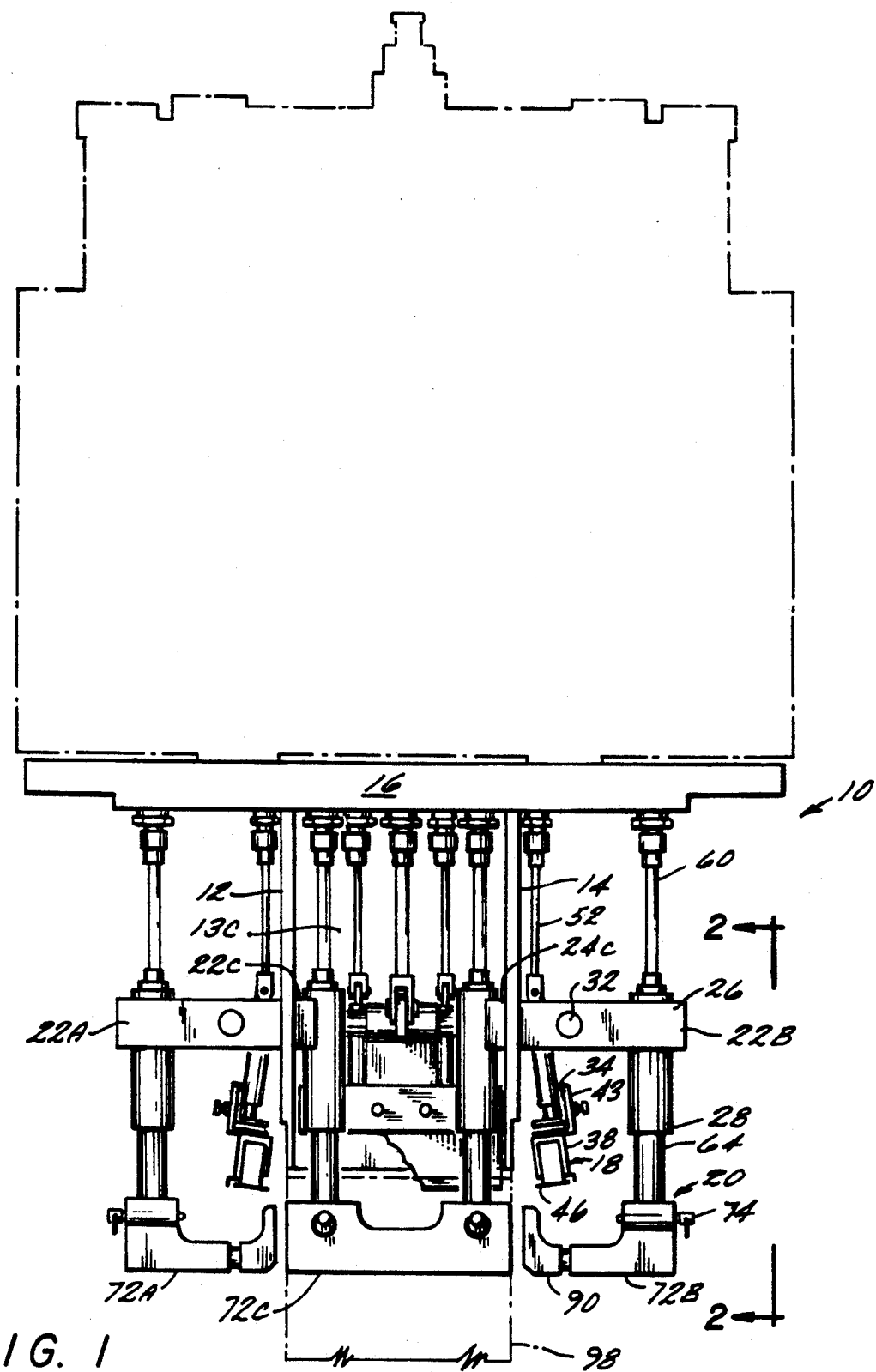
FIG. 1 is a front elevation view of the welding station of the present invention with associated prior art apparatus shown in phantom.

As discussed above, the overall apparatus is disclosed in detail in U.S. Pat. No. 4,352,977. With reference to FIG. 1, the overall apparatus is shown in phantom and the welding head assembly, as modified in accordance with the invention, is generally shown at 10. As diagrammatically illustrated in FIG. 5, the welding head assembly forms four heating, clamping and bead pressing assemblies which are designated as A, B, C and D respectively. As shown, said assemblies are positioned in opposing pairs, i.e. A and B, C and D. Assemblies C and D are short and have a length comparable to the relatively constant width of battery jars which are in a narrow series of either 6.19 or 6.25 inches or a wider series of 8.625 inches. Since the length of a battery can vary anywhere from about 2 inches to about 12 or 14 inches, assemblies A and B are longer and are positioned outside of assemblies C and D. Accordingly, assemblies A and B should have lengths equal to or greater than the longest length that will be handled and it has been found that a length of 13 to 14 inches is sufficient for most purposes. Each of the assemblies A, B, C and D is, apart from the length differences, constructed substantially identically.

Figure 5:
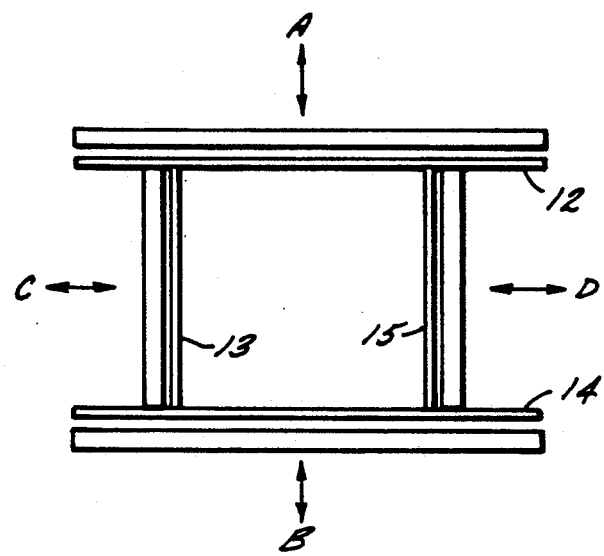
FIG. 5 is a diagrammatic view of the heating, clamping and bead pressing actions.

With reference to FIGS. 1 and 5, it will be seen that pairs of vertical mounting plates 12 and 14, and 13 and 15 are affixed to and extend downwardly from main horizontal mounting plate 16 which is a part of the apparatus disclosed in U.S. Pat. No. 4,352,977. As shown in FIG. 1, welding head assembly A is disposed on mounting plate 12, welding head assembly B is disposed on mounting plate 14, welding head assembly C is disposed on mounting plate 13 and welding head assembly D is disposed on mounting plate 15 (not shown in FIG. 1). In that the mounting of each welding head assembly to a vertical mounting plate is the same, discussion will be limited to the mounting of welding head assembly B to mounting plate 14.

Figure 2:
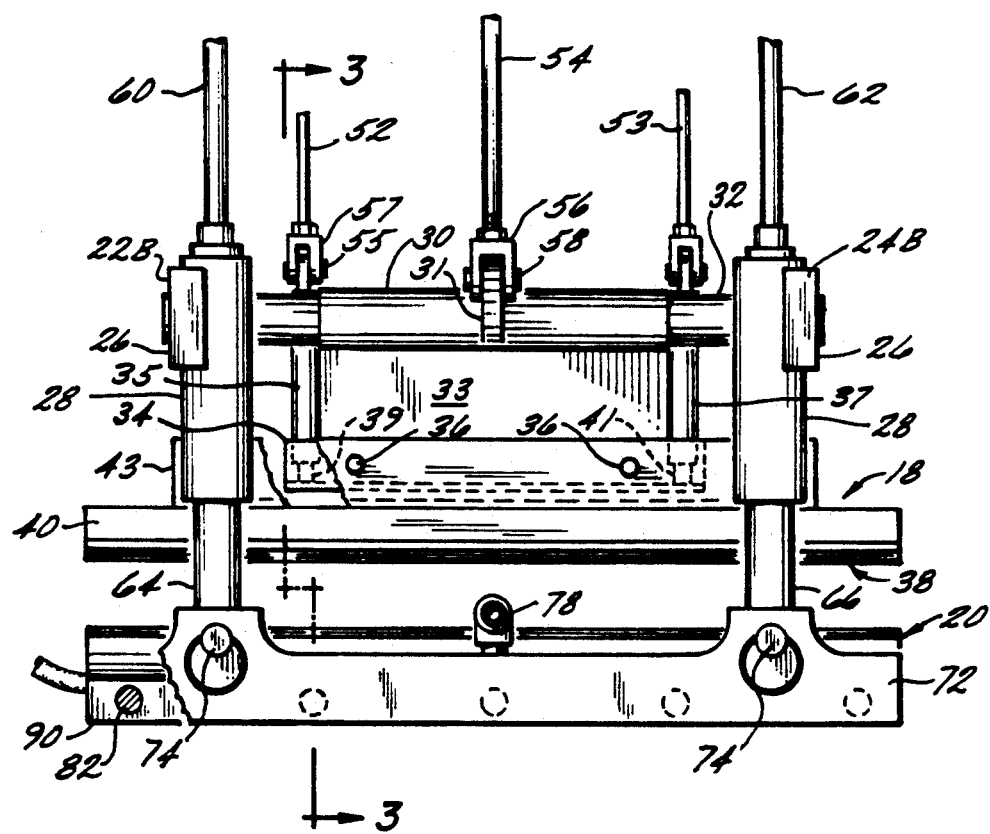
FIG. 2 is a side elevation view taken along the line 2—2 of FIG. 1.
Figure 3:
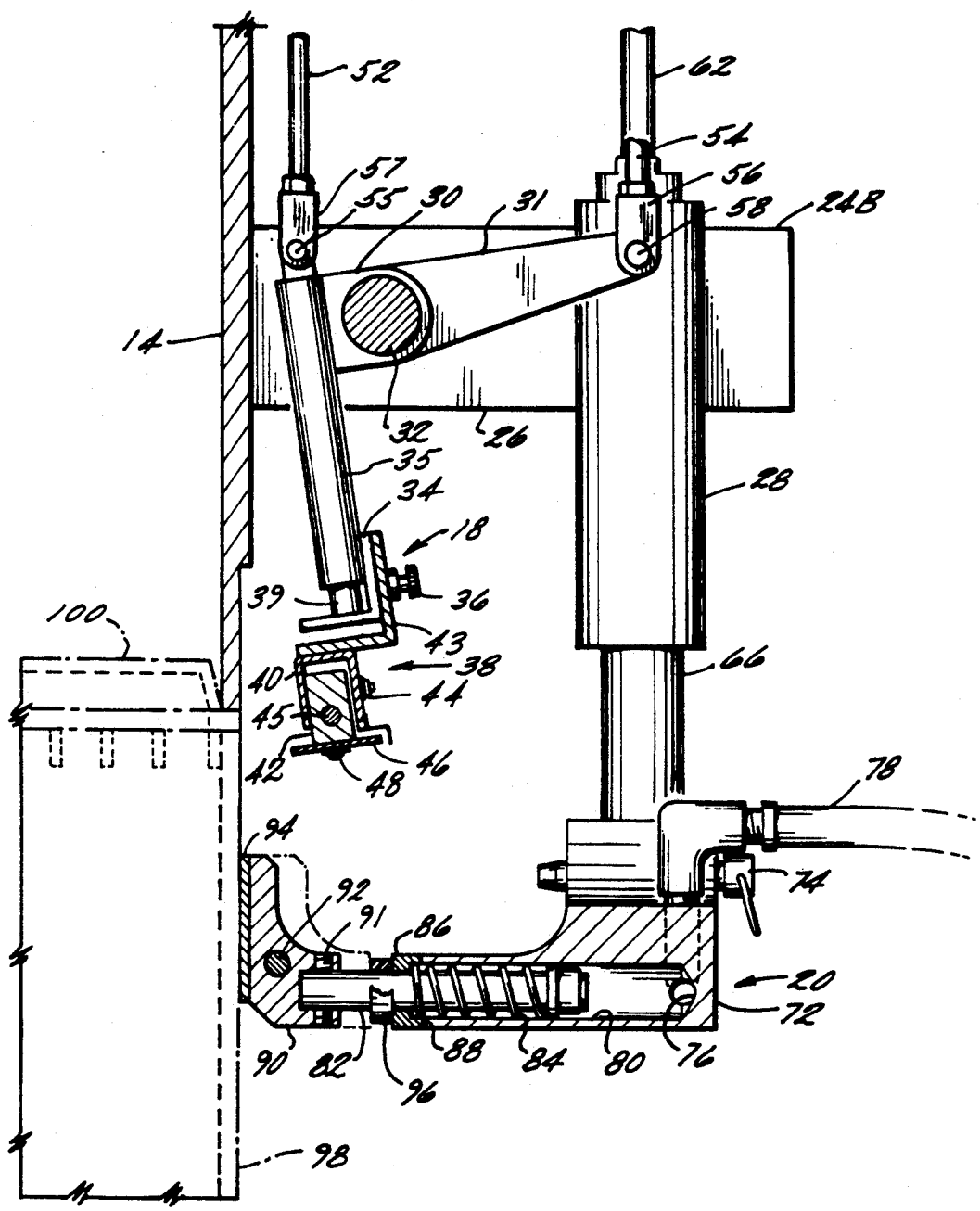
FIG. 3 is a section view taken along the line 3—3 of FIG. 2.

As depicted in FIGS. 1, 2 and 3, the welding head assembly B comprises a heating assembly 18 and a clamping and bead pressing assembly 20 which are disposed on and depend from a pair of brackets 22 and 24 mounted on the mounting plate 14. As shown, each bracket 22 and 24 has a horizontal portion 26 and a vertical portion 28.

The heating assembly 18 is comprised of an L-shaped crank 30 disposed on shaft 32 which is held between brackets 22 and 24. As shown, the crank 30 has a horizontal member 31 and a vertical member 33. A pair of bored guides 35 and 37 are vertically disposed on either side of the member 33. Shafts 39 and 41 are slidably disposed in guides 35 and 37. A bracket 34 is affixed to the ends of shafts 39 and 41 and is moveable therewith. Said bracket 34 supports a heater sub-assembly 38, which comprises a mounting bracket 43, an outer housing 40 affixed thereto, a heater block 42 containing a heater element 45 therein disposed in said outer housing 40 and held therein by bolts 44 and a heater blade 46 attached to the lower portion of said heater block 42 by screws 48. As shown, the heater sub-assembly 38 is releasably attached to bracket 34 by bolts 36.

The heating assembly 18 is disposed on the apparatus for substantially horizontal movement and for vertical movement. The horizontal movement is provided by the pivoting motion of the crank 30 on shaft 32 created by vertical movement of shaft 54 of a pneumatic or hydraulic cylinder (not shown) via clevis 56 and pin 58 which are attached to the outer end of arm 31. Substantially vertical movement of the shaft 54 causes the crank 30 to pivot about shaft 32 thus moving the heater blade 46 into or out of a position where it may be brought into heating contact with a battery jar and battery cover. Vertical movement of the heating assembly 18 is provided by a pair of pneumatic or hydraulic activated rods or cables 52 and 53 which are attached to the upper ends of shafts 39 and 41 by pins 55 and clevises 57. Up and down movement of rods 52 and 53, as described in U.S. Pat. No. 4,352,977, moves the heater blade 46 into and out of contact with a battery cover and battery jar as will be described below.

As seen in FIGS. 2 and 3, the clamping and bead pressing assembly 20 is located outwardly of and beneath said heating assembly 18 and is supported in said position by vertical Portions 28 of brackets 22 and 24 respectively. Said portions 28 are bored to slidably receive shafts 64 and 66 respectively which are attached at their upper ends (not shown) to the ends of rods 60 and 62 of pneumatic or hydraulic cylinders (not shown). A manifold 72 is attached to the lower ends of shafts 64 and 66 by release pins 74. The manifold 72 is provided with internal passageways 76 for receiving air or hydraulic fluid from a feed port 78. The manifold 72 is also provided with a plurality of piston cavities 80 which slidably receive pistons 82 therein. Said pistons 82 are provided with biasing means such as spring 84 which urges the piston inwardly of said manifold 72. A collar 86, disposed on the inward face 88 of said manifold 72 prevents the pistons 82 from coming out of the piston cavities 80.

With particular reference to FIG. 3, it will be seen that a presser foot 90 is affixed to the outer ends of said pistons 82 by screws 91. Said presser foot 90 is heated by heater 92 disposed therein and may be provided with a specialized contact plate 94. Bumpers 96 are disposed on each of the pistons 82 for reducing the shock which may be caused by the inward movement of the pistons 82 in response to return by springs 84.

OPERATION

The method and sequence of operation of the heating, clamping and bead pressing assemblies will be explained with primary reference to FIGS. 4A-4J.

Figure 4A:
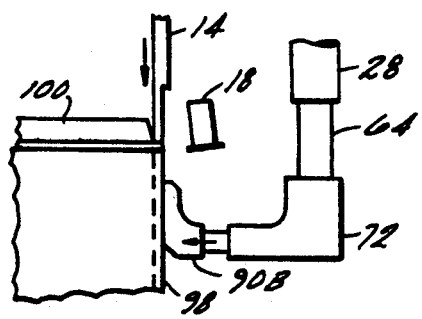
FIGS. 4A-4J are a series of diagrammatic FIGURES showing the operational sequence of the present invention.

In general, a battery jar 98 with cover 100 thereon is Positioned under the welding head assembly 10 as described in U.S. Pat. No. 4,352,977. At this point in time, the welding head assembly 10 descends so as to engage the cover 100 for pick-up thereof following engagement of the sides of the battery jar by the presser feet 90C and 90D and presser feet 90A and 90B. This condition, as it relates to assembly B, is schematically illustrated in FIG. 4A.

Figure 4B:
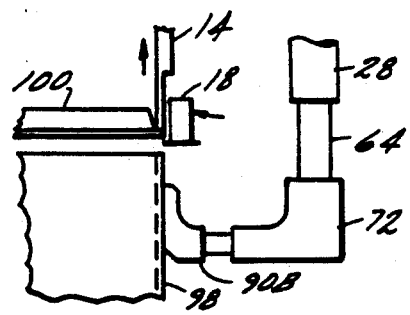
Figure 4C:
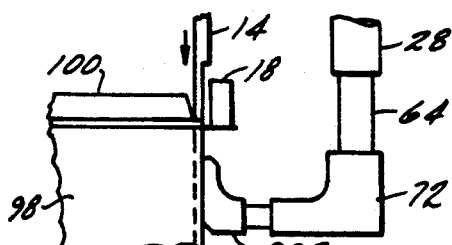

As shown in FIG. 4B, the cover 100 is raised with the welding head assembly 10 and the heating assembly 18 is pivoted into position so that the welding/heating blade 46 is disposed between the bottom of the cover 100 and the top of the jar 98 as a result of shaft 54, FIG. 2, being urged downwardly by the action of a hydraulic or pneumatic cylinder (not shown). Next in the sequence, the heating assembly is raised by the action of rods 52 and 53 being retracted so that the heating blade 46 comes into melting contact with the cover 100. As shown in FIG. 4C, the welding head assembly is then moved downward to a point wherein the heating blade 46 also comes into melting contact with the top of the jar 98.

Figure 4D:
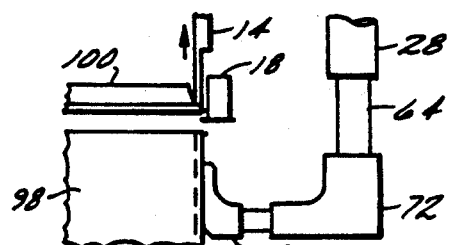
Figure 4E:
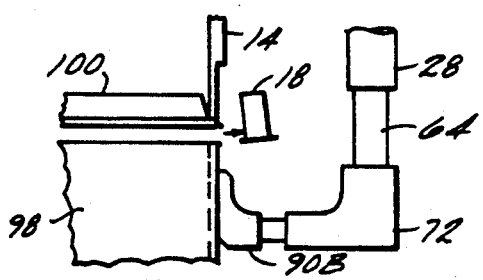

As depicted in FIG. 4D, the welding head assembly with the cover 100 is moved upward and the heating blade assembly is moved downward thus taking the heating blade out of contact with the cover 100 and the jar 98. As indicated in FIG. 4E, the heating assembly is then pivoted away from the jar and cover.

Figure 4F:
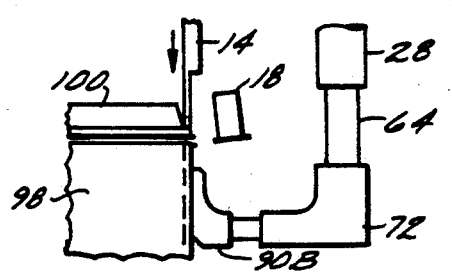
Figure 4G:
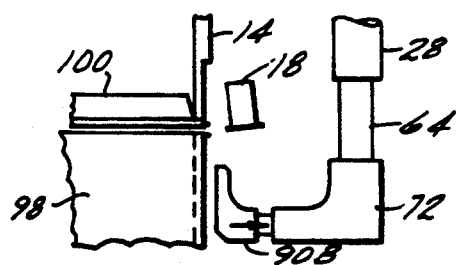
Figure 4H:
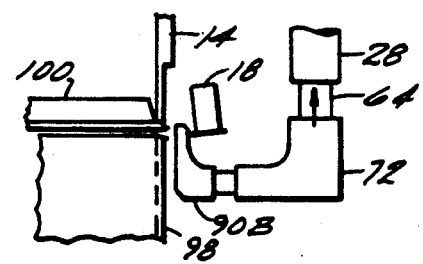

Next in the sequence of operation and as shown in FIG. 4F, the welding head assembly is moved downwardly to a point where the cover 100 and the jar 98 are almost touching. At this point, the presser foot 90B releases from clamping contact with the jar 98, as shown in FIG. 4G, and the assembly 20 is raised to a point where the presser foot 90B is positioned opposite the interface between the cover 100 and the jar 98, as shown in FIG. 4H.

Figure 4I:
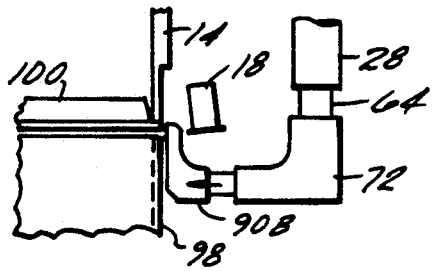
Figure 4J:
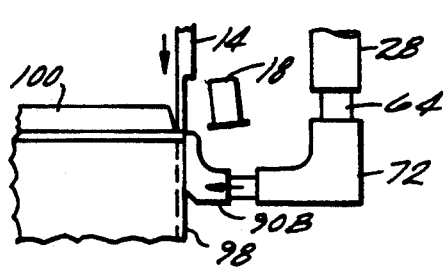

As depicted in FIG. 4I, the presser foot 90B is then moved inwardly to contact the jar 100 and the cover 98 and thereby flattens the bead created by the heater blade 46 at the interface of the cover 100 and the jar 98. In FIG. 4J, it will be seen that the cover 100 is then slowly lowered and clamped into full contact with the jar 98 causing the two to be welded together.

As stated above, battery cells made by the apparatus and method of the present invention are less likely to develop leaks at the jar/cover welded interface than are battery cells made by apparatus and methods of prior art. In support of this, thousands of battery cells made by the apparatus and method disclosed in U.S. Pat. No. 4,352,997 were tested for leaks over an eight-day period and exhibited an average leak rate of 0.52%. During the same period of time, battery cells produced by the apparatus and method of the present invention were also tested for leaks and exhibited an average leak rate of only 0.31%. In other words, the leak rate was cut almost in half.

While this invention has been described in connection with that which is presently conceived to be the preferred embodiment, it is to be understood that the present invention is not limited to the disclosed embodiment, but rather is intended to cover varying other modifications and equivalent arrangements included within the spirit and scope of the appended claims.

What is claimed is:

1. A welding apparatus for welding plastic battery covers to plastic battery jars to form a closed container, said apparatus comprising a frame, a work zone having loading, welding and unloading stations, means for moving said battery covers and battery jars to be welded together from said loading station to said welding station, means for moving welded battery covers and battery jars from said welding station to said unloading station, welding means for heating portions of said battery covers and battery jars, clamping means for heating portions of said battery covers and battery jars, clamping means for positioning and controlling the relationship between said battery covers and battery jars during welding, drive means for operating the apparatus and control means for activating the drive means in a predetermined sequence, the improvement which comprises means for pressing against the interface between the battery cover and battery jar during welding thereof wherein said means includes a plurality of presser feet individually disposed on said apparatus along each side of said container formed by said battery cover and battery jar, means for moving each presser foot in a vertical direction including a pair of brackets disposed on said apparatus, said brackets having a horizontal portion and a vertical portion, said vertical portion having a vertical bore therethrough, a shaft slidably disposed in said bore, a manifold attached to the lower end of said shaft and movable therewith, pneumatic means attached to the upper end of the shaft for moving same in a vertical direction, said presser foot being operatively associated with said manifold and moveable vertically therewith and means for moving each presser foot in a horizontal direction.

2. The apparatus of claim 1 wherein said means for moving each presser foot in a horizontal direction includes at least one cavity horizontally disposed in said manifold, a piston slidably disposed in said cavity, said piston having one end thereof affixed to said presser foot, means for retaining said piston in said cavity, biasing means for urging said piston into said cavity, a feed port for feeding an operating fluid to said manifold and an internal passageway for passing said operating fluid from said feed port through said manifold to said cavity.

3. The apparatus of claim 1 wherein each said presser foot includes heating means.

4. The apparatus of claim 2 wherein said individual presser feet are arranged in the same horizontal plane in two opposing pairs with each presser foot in each pair being positioned parallel to one another with the pairs being perpendicular to one another.

5. The apparatus of claim 4 wherein one of said opposing pairs lies within the area defined between the other one of said two opposing pairs.

* * * * *